United States Patent

Kornfeld

[15] 3,676,458
[45] July 11, 1972

[54] (INDOLYMETHYL) MALONATE COMPOUND

[72] Inventor: Edmund Carl Kornfeld, Indianapolis, Ind.
[73] Assignee: Eli Lilly and Company, Indianapolis, Ind.
[22] Filed: June 11, 1970
[21] Appl. No.: 57,872

Related U.S. Application Data

[62] Division of Ser. No. 719,666, April 8, 1968, Pat. No. 3,535,336, Division of Ser. No. 57,873, June 11, 1970.

[52] U.S. Cl. .................................................. 260/326.14 T
[51] Int. Cl. ........................................................ C07d 27/60
[58] Field of Search ........................................ 260/326.14 T

[56] References Cited

UNITED STATES PATENTS 2,847,420  8/1958  Weele et al .................... 260/326.14 T Primary Examiner—Alex Mazel
Assistant Examiner—Joseph A. Narcavage
Attorney—Everet F. Smith and Kathleen R. Schmoyer

[57] ABSTRACT

6-(Trifluoromethyl)tryptophane, useful as a non-nutritive sweetening agent and also useful in the synthesis of a corresponding pyrrolnitrin derivative; and intermediates useful in the synthesis of 6-(trifluoromethyl)tryptophane.

1 Claim, No Drawings

(INDOLYMETHYL) MALONATE COMPOUND

CROSS REFERENCE TO RELATED APPLICATIONS

This application is one of two divisional applications of my copending application Ser. No. 719,666, filed Apr. 8, 1968, since issued as U.S. Pat. No. 3,535,336. The other divisional application is Ser. No. 57,873 filed even date herewith.

DETAILED DESCRIPTION OF THE INVENTION

As set forth hereinabove, the present invention is directed to 6-(trifluoromethyl)tryptophane, a compound having the following structural formula:

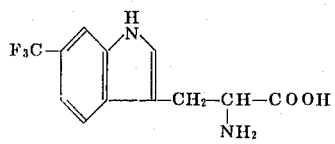

and to its non-toxic physiologically acceptable salts. The compound is useful as a non-nutritive sweetening agent and is also useful in the synthesis of a corresponding pyrrolnitrin derivative. The compound is prepared by the following reaction sequence:

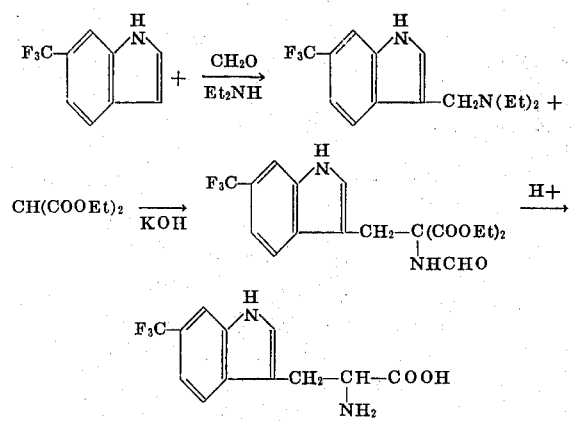

Thus, 6-trifluoromethyl)indole is subjected to a Mannich reaction to obtain 3-(diethylaminomethyl)-6-(trifluoromethyl)indole, which is then condensed with diethyl formamidomalonate to obtain the corresponding diethyl ([6-(trifluoromethyl)-3-indolyl]methyl)formamidomalonate. Hydrolysis and decarboxylation produce the desired 6-(trifluoromethyl)tryptophane.

In another aspect, the present invention is directed to 3-(diethylaminomethyl)-6-(trifluoromethyl)indole and diethyl ([6-(trifluoromethyl)-3-indolyl]methyl)formamidomalonate, intermediates useful in the synthesis of 6-(trifluoromethyl)tryptophane.

6-(Trifluoromethyl)tryptophane has an asymmetric carbon atom; but resolution of the racemic mixture is not necessary, the mixture itself being useful for the purposes of the present invention. However, only the d-enantiomorph is active as a non-nutritive sweetener. When for any reason it is desired to employ one enantiomorph, resolution of the racemic mixture can be achieved in procedures known in the prior art for the resolution of unsubstituted tryptophane. Three such procedures are discussed and exemplified in detail in *Chemistry of the Amino Acids*, Greenstein et al., Vol. 3, page 2,341 and following (John Wiley and Sons, Inc., New York [1961]); particular attention is directed to the first two of these (illustrative procedure 39–5 and illustrative procedure 39–6).

The preparation of 6-(trifluoromethyl)tryptophane is illustrated by the following examples.

EXAMPLE 1

3-(Diethylaminomethyl)-6-(trifluoromethyl)indole

To a solution of 7.53 grams of diethylamine (0.15 mole) in 22.5 ml. of cold 60 percent acetic acid was added 8.25 ml. of 37 percent aqueous formaldehyde. 6-(Trifluoromethyl)indole (19.0 grams; 0.10 mole) was then added, and the resulting mixture warmed to 60° C. After two hours at this temperature, the solution was poured into 360 ml. of 2N sodium hydroxide, and the desired 3-(diethylaminomethyl)-6-(trifluoromethyl)indole product extracted with ether. The extract was dried, and solvent removed by distillation to separate the product, which was an oil.

EXAMPLE 2

Diethyl ([6-(trifluoromethyl)-3-indolyl]methyl)formamidomalonate 3-(Diethylaminomethyl)-6-(trifluoromethyl)indole (12.5 grams; 0.046 mole), prepared as described in the foregoing example, and diethyl formamidomalonate (9.4 grams; 0.041 mole) were mixed in 31 ml. of toluene. Thereafter, 0.76 gram of powdered potassium hydroxide was added. The resulting mixture was refluxed, while bubbling in nitrogen, for 1.5 hours. It was then cooled, resulting in precipitation of the diethyl ([6-(trifluoromethyl)-3-indolyl]methyl)formamidomalonate product, which was separated by filtration and washed with water. A portion of the separated product was recrystallized from ethanol, and the recrystallized portion found to melt at 182°–5° C.

Analysis, Calc. for $C_{18}H_{19}F_3N_2O_5$: C, 53.99; H, 4.87; N, 6.73.

Found: C, 53.99; H, 4.78; N, 6.99.

EXAMPLE 3

6-(Trifluoromethyl)tryptophane

A solution of diethyl ([6-(trifluoromethyl)-3-indolyl]methyl)formamidomalonate (55.3 grams; 0.138 mole) in 330 ml. of 1.5N hydrochloric acid, 165 ml. of glacial acetic acid, and 50 ml. of ethanol was refluxed for 17 hours. The solution was then concentrated under vacuum, the residue neutralized with ammonium hydroxide, and the resulting 6-(trifluoromethyl)tryptophane product separated by filtration. The separated product was washed with water and ethanol, and a sample thereof recrystallized from acetic acid. The recrystallized portion melted at 267°–70° C. (dec.).

Analysis, Calc. for $C_{12}H_{11}F_3N_2O_2$: C, 52.94; H, 4.07; N, 10.29.

Found: C, 52.66; H, 4.22; N, 10.32.

As noted above, 6-(trifluoromethyl)tryptophane is useful as a non-nutritive sweetener, the compound being non-toxic to animals at rates at which it contributes a sweet taste.

For this application, the compound can be employed as such; but it is also possible to employ the compound as its non-toxic physiologically acceptable salt. The type or identity of salt is not critical except that it be non-toxic and physiologically acceptable; for the purposes of the present description, a non-toxic salt is one of which the toxicity is not materially greater than that of the compound from which it is derived. Suitable alkaline salts are the ammonium, sodium, potassium, calcium and magnesium salts. Of these, the sodium and calcium salts are preferred. Acid salt formation occurs at the amino nitrogen atom, the ring nitrogen atom being only weakly basic. The identity of the acid salt forming moiety is not critical, although it is necessary that the acid be a strong acid, that is, an acid having a pH of, numerically, below about 2, at a concentration of 0.1N. Suitable strong acids are hydrochloric, hydrobromic, hydriodic, sulfuric, and the like. Salts are prepared in accordance with known procedures comprising the reaction of the compound with a selected acid or base.

Generally, for the sweetening application of the compound or its salt, a concentration of about 0.075 percent by weight of the compound in liquids, foods, or the like gives a sweetening effect comparable to that of a 10 percent concentration of sucrose or to that of the standard non-nutritive sweetening combination of 0.01 percent of sodium saccharin and 0.1 percent of sodium cyclamate. Concentrations of less or more than 0.075 can be used where the item to be sweetened calls for a lesser or greater degree of sweetness than that of a 10 percent concentration of sucrose. The compound can be used alone, or it can be combined with other known sweetening agents, most notably, sodium saccharin or sodium cyclamate, in which case smaller amounts of the 6-(trifluoromethyl)tryptophane suffice. In representative operations, dl-6-(trifluoromethyl)tryptophane was evaluated alone and in combination with sodium saccharin. Comparison was made with a standard sweetening solution of 0.1 percent sodium cyclamate and 0.01 percent sodium saccharin (which standard sweetening solution is also equivalent to a 10 percent solution of sucrose). The pH of all solutions was 6.7. Those solutions having a sweetness comparable to the standard are set forth in the following table.

| Percent of dl-6-(trifluoromethyl)-tryptophane | Percent of Sodium Saccharin |
| --- | --- |
| 0.0 | >0.1 |
| 0.006 | 0.0125 |
| 0.075 | 0.0 |

In regard to the utility of 6-(trifluoromethyl)tryptophane as an intermediate in the production of a corresponding pyrrolnitrin derivative, the 6-(trifluoromethyl)tryptophane is added to a fermentation broth of the same type used for the production of the unsubstituted antibiotic pyrrolnitrin (*Journal of Antibiotics*, Series A, Vol. 18, page 211 [1965]). Addition of the 6-(trifluoromethyl)tryptophane results in the production of a modified pyrrolnitrin antibiotic of the following formulae:

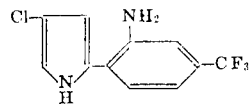

This modified pyrrolnitrin antibiotic is useful for the same purposes as unmodified pyrrolnitrin.

The 6-(trifluoromethyl)indole used as a starting material in the synthesis of 6-(trifluoromethyl)tryptophan is itself prepared by the method of Kalir et al. (*Israel J. of Chem.*, 14, 155 [1966]).

I claim:

1. Diethyl ([6-(trifluoromethyl)-3-indolyl]methyl)formamidomalonate.

* * * * *

UNITED STATES PATENT OFFICE
CERTIFICATE OF CORRECTION

Patent No. 3,676,458      Dated July 11, 1972

Inventor(s) Edmund Carl Kornfeld

It is certified that error appears in the above-identified patent and that said Letters Patent are hereby corrected as shown below:

In reference [54] the title "(INDOLYMETHYL)MALONATE COMPOUND" should read -- (INDOLYLMETHYL)MALONATE COMPOUND --.

In column 1, line about 37, the part of the formula which reads "CH(COOEt)$_2$" should read as follows:

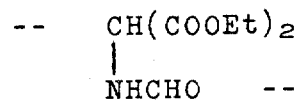

In column 3, line 14, "di-6-" should read -- dl-6- --.

Signed and sealed this 29th day of May 1973.

(SEAL)
Attest:

EDWARD M. FLETCHER, JR.
Attesting Officer

ROBERT GOTTSCHALK
Commissioner of Patents